(12) United States Patent
Lian et al.

(10) Patent No.: US 10,272,990 B2
(45) Date of Patent: Apr. 30, 2019

(54) AIRCRAFT WING ASSEMBLY

(71) Applicants: COMMERCIAL AIRCRAFT CORPORATION OF CHINA, LTD, Shanghai (CN); COMMERCIAL AIRCRAFT CORPORATION OF CHINA, LTD SHANGHAI AIRCRAFT DESIGN AND RESEARCH INSTITUTE, Shanghai (CN); SHANGHAI AIRCRAFT MANUFACTURING CO., LTD., Shanghai (CN)

(72) Inventors: Wei Lian, Shanghai (CN); Ming Li, Shanghai (CN); Jiangang Liu, Shanghai (CN); Chentao Weng, Shanghai (CN); Dehong Shen, Shanghai (CN); Yankai Liu, Shanghai (CN); Rui He, Shanghai (CN); Yuanqing Zhang, Shanghai (CN); Mengmeng Xu, Shanghai (CN)

(73) Assignees: Commercial Aircraft Corporation of China, LTD, Shanghai (CN); Commercial Aircraft Corporation of China, LTD Shanghai Aircraft Design and Research Institute, Shanghai (CN); Shanghai Aircraft Manufacturing Co., Ltd., Shanghai (CN)

( * ) Notice: Subject to any disclaimer, the term of this patent is extended or adjusted under 35 U.S.C. 154(b) by 314 days.

(21) Appl. No.: 15/309,933

(22) PCT Filed: Sep. 29, 2015

(86) PCT No.: PCT/CN2015/091041
§ 371 (c)(1),
(2) Date: Nov. 9, 2016

(87) PCT Pub. No.: WO2016/050198
PCT Pub. Date: Apr. 7, 2016

(65) Prior Publication Data
US 2017/0267333 A1    Sep. 21, 2017

(30) Foreign Application Priority Data

Sep. 30, 2014 (CN) .......................... 2014 1 0520467

(51) Int. Cl.
*B64C 3/52* (2006.01)
*B64C 23/06* (2006.01)
(Continued)

(52) U.S. Cl.
CPC ............ *B64C 23/069* (2017.05); *B64C 3/187* (2013.01); *B64C 3/52* (2013.01); *B64F 5/00* (2013.01); *Y02T 50/164* (2013.01)

(58) Field of Classification Search
CPC ......... B64C 23/069; B64C 3/187; B64C 3/52; B64F 5/00
See application file for complete search history.

(56) References Cited

U.S. PATENT DOCUMENTS 2,468,425 A * 4/1949 Carpenter ................. B64C 3/56
244/49
2,609,165 A * 9/1952 Hill .......................... B64C 13/00
244/215
(Continued)

FOREIGN PATENT DOCUMENTS

CN 101214853 7/2008
CN 101288067 A 10/2008
(Continued)

OTHER PUBLICATIONS

Chinese Office Action, dated Mar. 9, 2014.
(Continued)

*Primary Examiner* — Justin M Benedik
(74) *Attorney, Agent, or Firm* — Dority & Manning, P.A.

(57) ABSTRACT

An airplane wing assembly includes a wing, a winglet and a connection element. The wing has a wing box. The wing box is located at a wing tip of the wing and the winglet is connected with the wing by the wing box. The connection element includes a butt joint rib, which is assembled with the wing box, and a center connection, which is assembled with (Continued)

the winglet. The butt joint rib has a first shearing pin hole and a second shearing pin hole, into which are press fitted a corresponding first and a second shearing pin respectively to form interference fit. The center connector has a first sleeve hole and a second sleeve hole.

8 Claims, 2 Drawing Sheets

(51) Int. Cl.
*B64C 3/18* (2006.01)
*B64F 5/00* (2017.01)

(56) References Cited

U.S. PATENT DOCUMENTS

| | | | | |
|---|---|---|---|---|
| 4,776,542 | A * | 10/1988 | Van Dam | B64C 3/10 244/198 |
| 5,201,479 | A * | 4/1993 | Renzelmann | B64C 3/56 244/49 |
| 5,350,135 | A * | 9/1994 | Renzelmann | B64C 3/56 244/49 |
| 5,381,986 | A * | 1/1995 | Smith | B64C 3/56 244/49 |
| 6,089,502 | A * | 7/2000 | Herrick | B64C 3/10 244/35 R |
| 8,083,185 | B2 * | 12/2011 | Konings | B64C 3/385 244/199.4 |
| 8,128,020 | B2 | 3/2012 | Pitt et al. | |
| 8,727,285 | B2 | 5/2014 | Theurich et al. | |
| 8,751,922 | B2 | 6/2014 | Epstein | |
| 9,145,203 | B2 | 9/2015 | Campbell, Jr. et al. | |
| 9,422,049 | B2 | 8/2016 | Whitlock et al. | |
| 9,499,252 | B2 * | 11/2016 | Lassen | B64C 3/56 |
| 2005/0133672 | A1 * | 6/2005 | Irving | B64C 23/072 244/201 |
| 2006/0091258 | A1 | 5/2006 | Chiu et al. | |
| 2007/0018049 | A1 * | 1/2007 | Stuhr | B64C 23/069 244/124 |
| 2008/0210822 | A1 | 9/2008 | Hanusa et al. | |
| 2009/0283639 | A1 | 11/2009 | Ackermann et al. | |
| 2014/0061371 | A1 * | 3/2014 | Good | B64C 3/56 244/49 |
| 2014/0117150 | A1 * | 5/2014 | Good | B64C 3/56 244/49 |
| 2014/0117151 | A1 * | 5/2014 | Fox | B64C 23/072 244/49 |
| 2014/0117158 | A1 | 5/2014 | Davies et al. | |
| 2015/0203190 | A1 | 7/2015 | Witte et al. | |

FOREIGN PATENT DOCUMENTS

| | | |
|---|---|---|
| CN | 101535124 A | 9/2009 |
| CN | 201999199 U | 10/2011 |
| CN | 103547505 A | 1/2014 |
| CN | 104108463 A | 10/2014 |
| CN | 104290900 A | 1/2015 |
| CN | 104736433 A | 6/2015 |
| JP | 2012245832 | 12/2012 |
| PL | 66584 Y1 | 6/2013 |

OTHER PUBLICATIONS

Extended European Search Report (15846306.7-1754) dated Dec. 21, 2017.
International Search Report, dated Jan. 6, 2016.

* cited by examiner

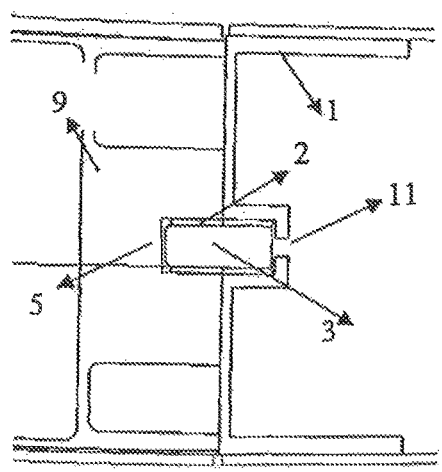
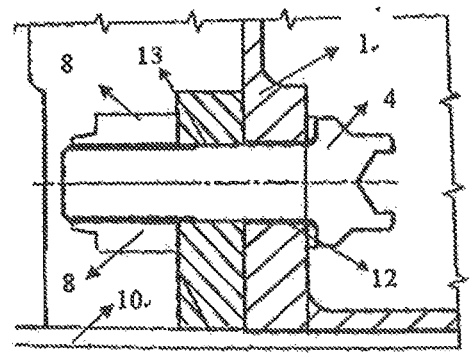
FIG. 4
FIG. 5
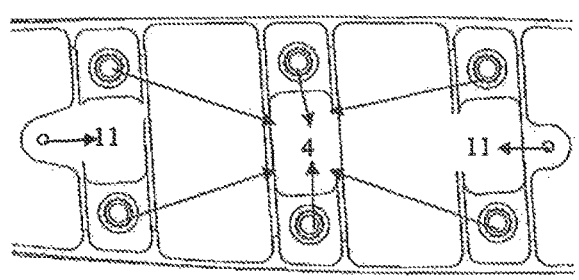
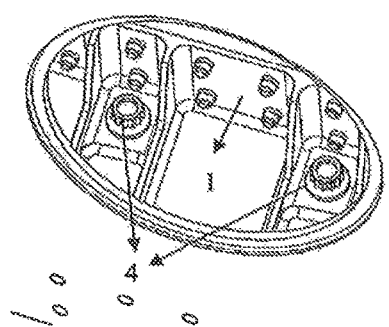
FIG. 6
FIG. 7

AIRCRAFT WING ASSEMBLY

CROSS-REFERENCE TO RELATED APPLICATIONS

This application claims priority to International Application Serial No. PCT/CN2015/091041, filed Sep. 29, 2015, which claims priority to Chinese Application No. 201410520467.9, filed Sep. 30, 2014. International Application Serial No. PCT/CN2015/091041 is hereby incorporated herein in its entirety for all purposes by this reference.

FIELD OF THE DISCLOSURE

The present disclosure relates to an aircraft wing assembly, and more specifically relates to an aircraft wing assembly that can implement an interchangeable connection between a winglet and a wing box.

BACKGROUND OF THE INVENTION

A winglet is an aerodynamic efficiency sensitive component located at a wing tip and deigned for reducing an induced drag for an aircraft, reducing tip vortex, lowering fuel consumption, and enhancing competitiveness of the aircraft. Its installation posture should be strictly guaranteed. Meanwhile, the winglet component is located in a lightning strike I-A zone such that it is susceptible to lightning strike or easily damaged due to crash with a boarding bridge, another plane or a building in adjacency when the aircraft is parking and taxing. The winglet has a relatively small structure, and thus when the winglet is damaged seriously, it is usually directly replaced in consideration of maintenance, cost, and aerodynamic efficiency factors. Furthermore, because the winglet is of a closed structure, it needs to be installed/removed for multiple times for structural maintenance and overhaul during its service.

Therefore, it is desirable that a connection between a winglet and a wing may provide a good interchangeability with the winglet installation posture well guaranteed so as to enhance its maintenance.

A known solution for implementing an interchangeable connection between a winglet and a wing is disclosed for example in a US patent application filed by Airbus Operations Limited with a publication No. US20140117158 (A1). However, the connection manner employed in that application uses 14 hinging lugs that need to satisfy a requirement of proper alignment with high precision, and thus the processing techniques of parts are highly complex and it is difficult to align during assembling of the winglet.

BRIEF SUMMARY OF THE INVENTION

In view of the above problems, the present disclosure provides a connection structure that provides a natural positioning datum for installing a winglet and a wing box such that with the positioning datum, the installation posture of a winglet is guaranteed and meanwhile an interchangeability requirement of the winglet is guaranteed.

According to an embodiment of the present disclosure, there is provided an aircraft wing assembly, including: an aircraft wing having a wing box; a winglet disposed at a wing tip of the aircraft wing and connected to the aircraft wing through the wing box; a connection part comprising a joint rib for being assembled with the wing box and a center joint for being assembled with the winglet, wherein the joint rib has a first shearing pin hole and a second shearing pin hole for being pressed with corresponding first and second shearing pins to form an interference fit, respectively; the center joint has a first bushing hole and a second bushing hole for being pressed with corresponding first and second bushings to form an interference fit; a positional relationship between the first shearing pin hole and the second shearing pin hole is identical to that between the first bushing hole and the second bushing hole, such that when the winglet assembled with the center joint moves towards the wing box assembled with the joint rib, and when the first and second shearing pins are inserted into the first bushing hole and the second bushing hole on the center joint, respectively, a small clearance fit is achieved between the first and second shearing pins and the first and second bushings, respectively.

Preferably, the connection part further includes a first round bushing and a second round bushing for being pressed into the first and second shearing pins' holes, and the first and second shearing pins are pressed into the first and second round bushings, such that a secure interference fit is achieved between the first and second shearing pins and the first and second round bushings, respectively.

Preferably, the second bushing hole is larger than the first bushing hole, and the connection part further includes a third bushing larger than the second bushing for being pressed into the second bushing hole, such that the second bushing hole is pressed into the third bushing to form an interference fit.

Preferably, an inner hole of the second bushing is of an elongated round shape.

Preferably, bottoms of the first and second shearing pins' holes are provided with a round hole, respectively, for exhausting gas when the shearing pins are pressed in and/or for ejecting out the shearing pins through the round holes for change.

Preferably, the center joint is further equipped with a plurality of barrel nuts, and the connection part further includes a plurality of tension bolts for being inserted through the joint rib after clearance fits are achieved between the first and second shearing pins and the first and second bushings, and being threaded tightly in the plurality of barrel nuts till the joint rib is adhered to a joint plane of the center joint.

Preferably, the tension bolts form clearance fits with via-holes on the joint rib and with via-holes on the center joint, respectively.

Preferably, a number of the barrel nuts and that of the tension bolts are both 6.

With the solution of the present disclosure, such relative positional relationships between two shearing pins and the two bushing holes provide a natural positioning datum when assembling a winglet. When the two shearing pins and the adhering reference planes readily mate, the posture of the winglet is uniquely determined. Further, a rear one of the two bushing holes is designed into an elongated round shape, which provides assembling compensation in consideration of fabrication tolerance. The fits between the shearing pins and the center joint of the winglet are clearance fit with tight tolerance, which guarantees a smooth installation/removal and ensures a good load transferring while guaranteeing interchangeability of the winglet.

BRIEF DESCRIPTION OF THE ACCOMPANYING DRAWINGS

After reading the description of the preferred embodiments of the present disclosure with reference to the accompanying drawings, the present disclosure will be better understood, and other objectives, details, features and advantages of the present disclosure will become more apparent. In the accompanying drawings:

FIG. 4 illustrates a schematic diagram of connections of shearing pins according to the present disclosure;

FIG. 5 illustrates a schematic diagram of the connection relationship between tension bolts and barrel nuts;

FIG. 6 illustrates a schematic diagram of the joint rib and the center joint of the winglet after the bolts are installed; and FIG. 7 illustrates a schematic diagram of installation passages between the tension bolts and the barrel nuts.

DETAILED DESCRIPTION OF THE PREFERRED EMBODIMENTS

Figure 1:
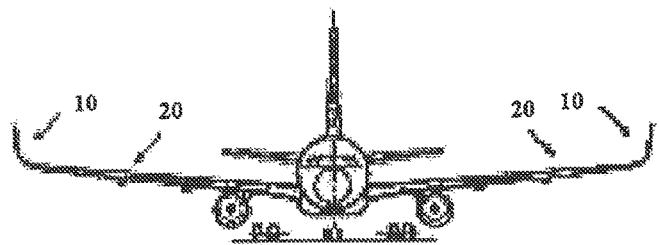
FIG. 1 illustrates a schematic diagram of a positional relationship between an aircraft wing and a winglet in the prior art.

Hereinafter, the preferred embodiments of the present disclosure will be described in more detail with reference to the accompanying drawings. Although the preferred embodiments of the present disclosure are illustrated in the drawings, it should be understood that the present disclosure may be implemented in various forms and should not be limited by the embodiments illustrated here. On the contrary, providing of these embodiments is to make the present disclosure more thorough and complete so as to be capable of conveying the scope of the present disclosure completely to those skilled in the art.

FIG. 1 illustrates a schematic diagram of a positional relationship between an aircraft wing and a winglet in the prior art. As illustrated in FIG. 1, the winglet 10 is located at a wing tip position of an aircraft wing 20 and is connected to the wing 20 through a specific connection part. The wing 20 has a wing box (not shown) and the winglet 10 is connected to the wing 20 through the wing box.

Figure 2:
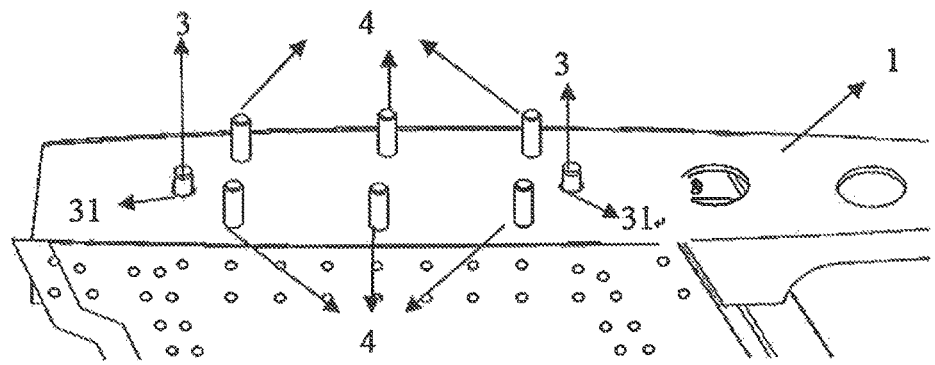
FIG. 2 illustrates a structural schematic diagram of a joint rib.
Figure 3:
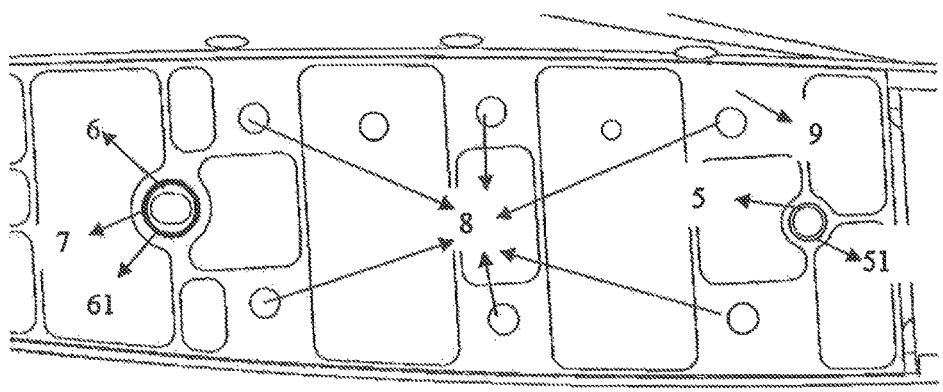
FIG. 3 illustrates a schematic diagram of a center joint of a winglet.

According to the embodiments of the present disclosure, the connection part between the winglet 10 and the wing 20 includes a joint rib and a center joint. The joint rib is assembled with the wing box of the wing 20, and the center joint is assembled with the winglet. Preferably, the center joint is assembled at a root of the winglet, while the joint rib is assembled at a tip of the wing box. Preferably, a face that attaches the center joint of the winglet to the joint rib of the wing box is a reference plane. FIG. 2 illustrates a structural schematic diagram of the joint rib. FIG. 3 illustrates a schematic diagram of a center joint of the winglet.

As illustrated in FIG. 2, the joint rib 1 has two shearing pins' holes 31 for being pressed with corresponding shearing pins 3, respectively. Preferably, the fit between the shearing pins 3 and the shearing pins' holes 31 is an interference fit, which guarantees a good load transferring.

Herein, the shearing pin has a function of a locating pin and is designed to enable an interference fit between the shearing pin and the wing box and a clearance fit between the shearing pin and the center joint of the winglet.

Preferably, when the shearing pin 3 is installed, first a respective one of two round bushings 2 is pressed into a respective one of the two shearing pins' holes 31 to form an interference fit, and then the shearing pins 3 are pressed into the two round bushings 2, such that the bushings 2 and the shearing pins 3 form a secure interference fit. In other words, the fit between the bushings 2 and the shearing pins' holes 31 and the fit between the shearing pins 3 and the round bushings 2 are both interference fits so as to guarantee a good load transferring during assembling.

FIG. 4 illustrates a schematic diagram of connections of shearing pins according to the present disclosure. As illustrated in FIG. 4, in a preferred implementation, a round hole 11 is provided at a bottom of the shearing pin hole 31, for exhausting gas when the shearing pin 3 is pressed in, or for ejecting out the shearing pin 3 through the round holes 11 by using a tool when changing the shearing pin 3 during the service procedure.

As illustrated in FIG. 3, the center joint 9 of the winglet 10 has a front side bushing hole 51 and a rear side bushing hole 61, in which bushings 5 and 6 are pressed therein, respectively. Preferably, the fits between the bushings 5 and 8 and corresponding bushing holes 51 and 61 are also interference fits, which guarantees a good load transferring during assembling.

Preferably, two shearing pins' holes 31 and two bushing holes 51 and 61 are located on a central axis of the joint rib 1 and that of the center joint 9.

Preferably, the rear side bushing hole 61 is larger than the front side bushing hole 51. A bushing 7 larger than the bushing 6 may be first pressed in the rear side bushing hole 61, and then the bushing 6 is pressed in the inner of the bushing 7. More preferably, the fit between the bushing hole 61 and the bushing 7 and that between the bushing 6 and the bushing 7 are also interference fits, so as to guarantee good load transferring during assembling.

More preferably, the inner hole of the bushing 6 is of an elongated round shape so as to provide assembly compensation under a certain fabrication tolerance. Here, the elongated round shape refers to a shape formed by a rectangle in the middle while two semi-circles at respective sides, which is also referred to as a runway shape.

A positional relationship between the two shearing pins' holes 31 is identical to that between the two bushing holes 51 and 61, such that during assembling of the winglet 10, when the winglet 10 assembled with the center joint 9 moves towards the wing box assembled with the joint rib 1, and when the two shearing pins 3 are inserted into the two bushing holes 51 and 61 on the center joint 9, respectively, a small clearance fit is achieved between the shearing pins 3 and the two bushings 5 and 6, respectively.

Such a clearance fit between the shearing pins 3 and the center joint 9 of the winglet 10 may guarantee smooth installation/removal of the winglet 10, while the interference fit between the shearing pin 3 and the shearing pin's hole 31 or the round bushing 2 at the joint rib side and the interference fit between the bushing 5 or 7 and the bushing hole 51 or 61 at the center junction side of the winglet can further guarantee interchangeability of components of the winglet while ensuring a good load transferring.

The center joint 9 is also pre-installed with a plurality of barrel nuts 8. When the clearance fits are implemented between the shearing pins 3 and the bushings 5 and 6, the center joint 9 is naturally adhered to a plane of the joint rib 1; then a plurality of tension bolts 4 are inserted into the respective barrel nuts 8 pre-installed in the center joint 9 through the joint rib 1, and the barrel nuts 8 are securely screwed till the joint rib 1 is adhered to the joint plane of the center joint 9. Preferably, a clearance fit is formed between the tension bolt 4 and the via-hole 12 on the joint rib 1 and between the tension bolt 4 and the via-hole 13 on the center joint 9, respectively.

After a desired torque is applied, the Joint between the winglet 10 and the wing 20 is achieved.

FIG. 5 illustrates a schematic diagram of the connection relationship between the tension bolts 4 and the barrel nuts 8. FIG. 6 illustrates a schematic diagram of the joint rib and the center joint of the winglet after the bolts 4 are installed.

FIG. 7 illustrates a schematic diagram of installation passages between the tension bolts 4 and the barrel nuts 8. As illustrated in FIG. 7, the tension bolts 4 are inserted into the barrel nuts 8 through the maintenance ports at an inner side of the joint rib 1 on a lower wing surface.

The design above provides a natural positioning datum when assembling the winglet, such that when the two shearing pins 3 are mated with the adhering reference face in place, the posture of the winglet 10 is uniquely determined.

The above depiction of the present disclosure is for enabling any person of normal skill in the art to implement or use the present disclosure. For a person of normal skill in the art, various modifications of the present disclosure are obvious, and a generality principle defined herein may also be applied to other modifications without departing from the spirit and protection scope of the present disclosure. Therefore, the present disclosure is not limited to the instances and designs disclosed herein; instead, it is consistent with the principle and the broadest scope of novelty features of the present disclosure.

The invention claimed is:

1. An aircraft wing assembly for an aircraft that includes a fuselage, the aircraft wing assembly comprising:
    an aircraft wing defining a wing tip at the end of the wing farthest from where the wing connects to the fuselage and having a wing box disposed at the wing tip;
    a winglet disposed at the wing tip of the aircraft wing and connected to the aircraft wing through the wing box;
    a connection part comprising a joint rib for being assembled with the wing box and a center joint for being assembled with the winglet,
    wherein the joint rib has first and second shearing pins' holes for being pressed with corresponding first and second shearing pins to form an interference fit, respectively; the center joint has a first bushing hole and a second bushing hole for being pressed with corresponding first and second bushings to form an interference fit; a positional relationship between the first shearing pin's hole and the second shearing pin's hole is identical to that between the first bushing hole and the second bushing hole, such that when the winglet assembled with the center joint moves towards the wing box assembled with the joint rib, and when the first and second shearing pins are inserted into the first bushing hole and the second bushing hole on the center joint, respectively, a small clearance fit is achieved between the first and second shearing pins and the first bushing and the second bushing, respectively.

2. The aircraft wing assembly according to claim 1, wherein the connection part further comprises a first round bushing and a second round bushing for being pressed into the first and second shearing pins' holes, and the first and second shearing pins are pressed into the first and second round bushings, such that a secure interference fit is achieved between the first and second shearing pins and the first and second round bushings, respectively.

3. The aircraft wing assembly according to claim 1, wherein the second bushing hole is larger than the first bushing hole, and the connection part further comprises a third bushing larger than the second bushing for being pressed into the second bushing hole, such that the second bushing hole is pressed into the third bushing to form an interference fit.

4. The aircraft wing assembly according to claim 3, wherein an inner hole of the second bushing is of an elongated round shape.

5. The aircraft wing assembly according to claim 1, wherein each of the bottoms of the first and second shearing pins' holes is provided with a round hole, respectively, for exhausting gas when the shearing pins are pressed in and/or for ejecting out the shearing pins through the round holes for change.

6. The aircraft wing assembly according to claim 1, wherein the center joint is further equipped with a plurality of barrel nuts, and the connection part further comprises a plurality of tension bolts for being inserted through the joint rib after clearance fits are achieved between the first and second shearing pins and the first bushing and the second bushing, and being threaded tightly in the plurality of barrel nuts till the joint rib is adhered to a joint plane of the center joint.

7. The aircraft wing assembly according to claim 6, wherein the tension bolts form clearance fits with via-holes on the joint rib and with via-holes on the center joint, respectively.

8. The aircraft wing assembly according to claim 6, wherein there are six barrel nuts and six tension bolts.

* * * * *